United States Patent
Gulwani et al.

(10) Patent No.: US 10,983,813 B2
(45) Date of Patent: Apr. 20, 2021

(54) AUTOMATIC REPETITION OF CONTEXT-SPECIFIC CODE EDITS

(71) Applicant: Microsoft Technology Licensing, LLC, Redmond, WA (US)

(72) Inventors: Sumit Gulwani, Sammamish, WA (US); Arjun Radhakrishna, Seattle, WA (US); Abhishek Udupa, Bellevue, WA (US); Gustavo Araujo Soares, Seattle, WA (US); Vu Minh Le, Bellevue, WA (US); Anders Miltner, Princeton, NJ (US); Mark A. Wilson-Thomas, Mercer Island, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/592,470

(22) Filed: Oct. 3, 2019

(65) Prior Publication Data

US 2020/0334054 A1 Oct. 22, 2020

(30) Foreign Application Priority Data

Apr. 19, 2019 (VN) .............................. 1-2019-01979

(51) Int. Cl.
*G06F 8/33* (2018.01)
*G06F 8/40* (2018.01)
*G06F 8/30* (2018.01)
*G06F 8/41* (2018.01)
*G06F 9/451* (2018.01)

(52) U.S. Cl.
CPC ............... *G06F 9/453* (2018.02); *G06F 8/33* (2013.01); *G06F 8/40* (2013.01)

(58) Field of Classification Search
CPC ... G06F 9/453; G06F 8/33; G06F 8/40; G06F 8/10; G06F 8/42; G06F 8/30
See application file for complete search history.

(56) References Cited

U.S. PATENT DOCUMENTS

| 8,370,799 B2 | 2/2013 | Nir-Buchbinder et al. |
| 9,170,782 B2 | 10/2015 | Carter et al. |
| 9,239,708 B2 | 1/2016 | Tillmann et al. |

(Continued)

OTHER PUBLICATIONS

"Eclipse Foundation", Retrieved From: https://web.archive.org/web/20181212042454/https://www.eclipse.org/, Dec. 12, 2018, 3 Pages.

(Continued)

*Primary Examiner* — Daxin Wu
(74) *Attorney, Agent, or Firm* — Workman Nydegger

(57) ABSTRACT

Automatically identifying context-specific repeated transformations (such as repeated edit tasks) that are based on observation of the developer drafting or modifying code. As the developer modifies the code, the code passes through a series of states, one after the other. The computing system observes the series of states of the code. It is based on this observation that the computing system identifies repeated transformations of the code for potentially offering to continue performing the repeated transformations for the user. This alleviates the developer from having to manually perform the remainder of the repeated transformations.

20 Claims, 11 Drawing Sheets

(56) References Cited

U.S. PATENT DOCUMENTS

| | | | |
|---|---|---|---|
| 9,383,973 | B2 | 7/2016 | Villar et al. |
| 9,449,044 | B1 | 9/2016 | Little et al. |
| 9,703,553 | B2 | 7/2017 | Bates et al. |
| 9,703,554 | B2 | 7/2017 | Eberlein et al. |
| 2008/0172660 | A1* | 7/2008 | Arning .............. G06F 8/33 717/144 |
| 2009/0319995 | A1* | 12/2009 | Gawor ............... G06F 8/33 717/125 |
| 2011/0314446 | A1* | 12/2011 | Esbensen ........ G06F 40/166 717/110 |
| 2012/0210298 | A1* | 8/2012 | Hodgins ............. G06F 8/71 717/113 |
| 2017/0052765 | A1* | 2/2017 | Lee ................. G06F 8/47 |
| 2019/0294432 | A1* | 9/2019 | Tornhill .......... G06Q 10/0635 |

OTHER PUBLICATIONS

"IntelliJ Idea", Retrieved From: https://web.archive.org/web/20181212015701/https://www.jetbrains.com/idea/, Dec. 12, 2018, 7 Pages.

"Language Server Protocol", Retrieved From: https://web.archive.org/web/20180126165935/https:/microsoft.github.io/language-server-protocol/, Jan. 26, 2018, 2 Pages.

"Resharper", Retrieved From: https://web.archive.org/web/20181212015703/https://www.jetbrains.com/resharper/, Dec. 12, 2018, 8 Pages.

"Smart editor", Retrieved From: https://web.archive.org/web/20160804124710/https:/www.jetbrains.com/clion/features/smart-editor.html, Aug. 4, 2016, 3 Pages.

"Visual Studio", Retrieved From: https://web.archive.org/web/20181212001008/https://visualstudio.microsoft.com/, Dec. 12, 2018, 5 Pages.

"XPath Tutorial", Retrieved From: https://web.archive.org/web/20161231110236/https://www.w3schools.com/xml/xpath_intro.asp, Dec. 31, 2016, 5 Pages.

Aho, et al., "Compilers: Principles, Techniques, and Tools (2nd Edition)", In Publication of Addison-Wesley, Sep. 10, 2006, 1037 Pages.

Andersen, et al., "Generic Patch Inference", In Proceedings of the 23rd IEEE/ACM International Conference on Automated Software Engineering, Sep. 15, 2008, pp. 337-346.

Andersen, et al., "Semantic Patch Inference", In Proceedings of the 27th IEEE/ACM International Conference on Automated Software Engineering, Sep. 3, 2012, pp. 382-385.

Raza, et al., "Disjunctive Program Synthesis: A Robust Approach to Programming by Example", In Proceedings of the Thirty-Second AAAI Conference on Artificial Intelligence, Apr. 25, 2018, 10 Pages.

Feser, et al., "Synthesizing Data Structure Transformations from Input-output Examples", In Proceedings of the 36th ACM SIGPLAN Conference on Programming Language Design and Implementation, Jun. 13, 2015, pp. 229-239.

Foster, et al., "Witchdoctor: IDE Support for Real-Time Auto-Completion of Refactorings", In Proceedings of the 34th International Conference on Software Engineering, Jun. 2, 2012, pp. 222-232.

Rolim, et al., "Learning Syntactic Program Transformations from Examples", In Proceedings of the 39th International Conference on Software Engineering, May 20, 2017, pp. 404-415.

Gulwani, Sumit, "Automating String Processing in Spreadsheets Using Input-Output Examples", In Proceedings of the 38th Annual ACM SIGPLAN-SIGACT Symposium on Principles of Programming Languages, Jan. 26, 2011, pp. 317-330.

Murphy-Hill, et al., "How We Refactor, and How We Know It", In In Proceedings of IEEE 31st International Conference on Software Engineering, May 16, 2009, pp. 287-297.

Kim, et al., "A Field Study of Refactoring Challenges and Benefits", In Proceedings of the ACM SIGSOFT 20th International Symposium on the Foundations of Software Engineering, Nov. 11, 2012, pp. 1-11.

Kim, et al., "Discovering and Representing Systematic Code Changes", In Proceedings of the 31st International Conference on Software Engineering, May 16, 2009, pp. 309-319.

Le, et al., "FlashExtract: A Framework for Data Extraction by Examples", In Proceedings of the 35th ACM SIGPLAN Conference on Programming Language Design and Implementation, Jun. 9, 2014, 12 Pages.

Leung, et al., "Interactive Parser Synthesis by Example", In Proceedings of 36th ACM SIGPLAN Conference on Programming Language Design and Implementation, Jun. 13, 2015, pp. 565-574.

Raychev, et al., "Code Completion with Statistical Language Models", In Proceedings of the 35th ACM SIGPLAN Conference on Programming Language Design and Implementation, Jun. 9, 2014, pp. 419-428.

Martin, et al., "Finding Application Errors and Security Flaws Using PQL: A Program Query Language", In Proceedings of the 20th Annual ACM SIGPLAN Conference on Object-oriented Programming, Systems, Languages, and Applications, Oct. 16, 2005, pp. 365-383.

Meng, et al., "LASE: Locating and Applying Systematic Edits by Learning from Examples", In Proceedings of the 35th International Conference on Software Engineering, May 18, 2013, pp. 502-511.

Meng, et al., "Systematic Editing: Generating Program Transformations from an Example", In Proceedings of the 32nd ACM SIGPLAN Conference on Programming Language Design and Implementation, Jun. 4, 2011, pp. 329-342.

Mens, et al., "A Survey of Software Refactoring", In Journal of IEEE Transactions on Software Engineering, vol. 30, Issue 2, Feb. 2002, pp. 126-139.

Miller, et al., "LAPIS: Smart Editing with Text Structure", In Proceedings of Conference on Human Factors in Computing Systems, Apr. 20, 2002, pp. 496-497.

Miltner, et al., "On the Fly Synthesis of Code Edit Suggestions", In Proceedings of the ACM on Programming Languages, Oct. 2019, 29 Pages.

Murphy-Hill, et al., "High Velocity Refactorings in Eclipse", In Proceedings of the OOPSLA Workshop on Eclipse Technology Exchange, Oct. 21, 2007, pp. 1-5.

Negara, et al., "Mining Fine-grained Code Changes to Detect Unknown Change Patterns", In Proceedings of the 36th International Conference on Software Engineering, May 31, 2014, pp. 803-813.

Nguyen, et al., "A Graph-based Approach to API Usage Adaptation", In Proceedings of the ACM International Conference on Object Oriented Programming Systems Languages and Applications, Oct. 17, 2010, pp. 302-321.

Nguyen, et al., "A Study of Repetitiveness of Code Changes in Software Evolution", In Proceedings of the 28th IEEE/ACM International Conference on Automated Software Engineering, Nov. 11, 2013, pp. 180-190.

Opdyke, William F.., "Refactoring Object-Oriented Frameworks", In Doctoral Dissertation Submitted to University of Illinois, 1992, 206 Pages.

Park, et al., "An Empirical Study of Supplementary Bug Fixes", In Proceedings of IEEE Working Conference on Mining Software Repositories, Jun. 2, 2012, pp. 40-49.

Polozov, et al., "FlashMeta: A Framework for Inductive Program Synthesis", In Proceedings of International Conference on Object-Oriented Programming, Systems, Languages, and Applications, Oct. 25, 2015, pp. 107-126.

"International Search Report and Written Opinion Issued in PCT Application No. PCT/US20/024335", dated Jul. 7, 2020, 15 Pages.

Lieberman, Henry, "Your Wish is My Command: Programming by Example", In Publications of Morgan Kaufmann, Mar. 12, 2001, 443 Pages.

Cypher, Allen, "Watch What I Do: Programming by Demonstration", In Publications of MIT Press, May 1993, 1 Page.

* cited by examiner

```
private string CreateRq1row(int id, RunResult generalizationResults, RunResult coverageResult, RunResult naiveResults, RunResult optimizedResults
{
    bool success = { generalizationResults.Success;
    bool success1 = coverageResult.Success;
    bool success2 = naiveResults.Success;
    bool success3 = optimizedResults.Success;
    return $"{id}, {success}, {success1}, {success2}, {success3}";
}
```

FIG. 1A

```
private string CreateRq1row(int id, RunResult generalizationResults, RunResult coverageResult, RunResult naiveResults, RunResult optimizedResults
{
    bool success = generalizationResults.Timeout ? "timeout" ? generalizationResults.Success;
    bool success1 = coverageResult.Success;
    bool success2 = naiveResults.Success;
    bool success3 = optimizedResults.Success;
    return $"{id}, {success}, {success1}, {success2}, {success3}";
}
```

```
0 references
private string CreateRq1row(int id, RunResult generalizationResults, RunResult coverageResult, RunResult naiveResults, RunResult optimizedResults
{
    string | success = generalizationResults.Timeout ? "timeout" : generalizationResults.Success.ToString();
    bool success1 = coverageResult.Success;
    bool success2 = naiveResults.Success;
    bool success3 = optimizedResults.Success;
    return $"{id}, {success1}, {success2}, {success3}";
}
```

FIG. 1E

```
0 references
private string CreateRq1row(int id, RunResult generalizationResults, RunResult coverageResult, RunResult naiveResults, RunResult optimizedResults
{
    string success = generalizationResults.Timeout ? "timeout" : generalizationResults.Success.ToString();
    string| success1 = coverageResult.Success;
    bool success2 = naiveResults.Success;
    bool success3 = optimizedResults.Success;
    return $"{id}, {success1}, {success2}, {success3}";
}
```

FIG. 1F

```
12
13
14         0 references
15         private string CreateRq1row(int id, RunResult generalizationResults, RunResult coverageResult, RunResult naiveResults, RunResult optimizedResults
16         {
17             string success = generalizationResults.Timeout ? "timeout" : generalizationResults.Success.ToString();
18             string success1 = coverageResult.Timeout ? "timeout" : coverageResult.Success;
19             bool success2 = naiveResults.Success;
20             bool success3 = optimizedResults.Success;
21             return $"[{id}], {success1}, {success2}, {success3}";
22         }
23
24
25
```

*FIG. 1G*

```
12
13
14         0 references
15         private string CreateRq1row(int id, RunResult generalizationResults, RunResult coverageResult, RunResult naiveResults, RunResult optimizedResults
16         {
17             string success = generalizationResults.Timeout ? "timeout" : generalizationResults.Success.ToString();
18             string success1 = coverageResult.Timeout ? "timeout" : coverageResult.Success.ToString();
19             bool success2 = naiveResults.Success;
20             bool success3 = optimizedResults.Success;
21             return $"[{id}], {success1}, {success2}, {success3}";
22         }
23
24
25
```

```
12  {
13    }
14  }
   0 references
   private string CreateRq1row(int id, RunResult generalizationResults, RunResult coverageResult, RunResult naiveResults, RunResult optimizedResults
15  {
16    string success = generalizationResults.Timeout ? "timeout" : generalizationResults.Success.ToString();
17    string success1 = coverageResult.Timeout ? "timeout" : coverageResult.Success.ToString();
18    string success2 = naiveResults.Timeout ? "timeout" : naiveResults.Success.ToString();
19    bool success3 = optimizedResults.Success;
20
21    Inline temporary variable
22    Suggested change: string success3 = optimizedResults.Timeout ? "timeout"
23        Suggested change: string success3 = optimizedResults.Timeout ? "timeout" : optimizedResults.Success.ToString();
24  }
25
```

*FIG. 1K*

```
12  {
13    }
14  }
   0 references
   private string CreateRq1row(int id, RunResult generalizationResults, RunResult coverageResult, RunResult naiveResults, RunResult optimizedResults
15  {
16    string success = generalizationResults.Timeout ? "timeout" : generalizationResults.Success.ToString();
17    string success1 = coverageResult.Timeout ? "timeout" : coverageResult.Success.ToString();
18    string success2 = naiveResults.Timeout ? "timeout" : naiveResults.Success.ToString();
19    string success3 = optimizedResults.Timeout ? "timeout" : optimizedResults.Success.ToString();
20    return $"{id}, {success1}, {success2}, {success3}";
21
22  }
23
24
25
```

AUTOMATIC REPETITION OF CONTEXT-SPECIFIC CODE EDITS

CROSS-REFERENCE TO RELATED APPLICATIONS

This application claims the benefit of and priority to Vietnamese Patent Application Serial No. 1-2019-01979 filed on Apr. 19, 2019 and entitled "AUTOMATIC REPETITION OF CONTEXT-SPECIFIC CODE EDITS," which application is expressly incorporated herein by reference in its entirety.

BACKGROUND

Computer programs are typically generated by a group of one or more developers generating code in a source code language. Code can become quite voluminous, involving thousands, or even perhaps millions of lines of code. Developers often find themselves performing repetitive code edits to add new features, refactor, and fix bugs during software development. For instance, changing a method signature may require changing all invocations of this method in the codebase. Besides being tedious, manually performing these edits is error-prone and time consuming.

Developers often submit multiple commits to accomplish a single repetitive code edit task because they misplace where the edit should have been applied or they incorrectly apply the edit to some locations. To reduce the developer burden involved in making such mechanical edits, Integrated Development Environments (IDEs) implement transformations for some fixed classes of repetitive edits that are frequently encountered by many developers. These fixed-class repetitive edits will be referred to herein as "general-purpose" repetitive edits since they are applicable to a wide variety and number of developers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to automatically identifying context-specific repeated transformations (i.e., code edit tasks) that are based on observation of the developer drafting or modifying the code. As the developer modifies the code, the code passes through a series of states, one after the other. The computing system observes the series of states of the code. It is based on this observation that the computing system identifies repeated transformations (e.g., repeated edits) of the code for potentially offering to continue performing the repeated transformations for the user. This alleviates the developer from having to manually perform the remainder of the repeated transformations.

The computing system uses the observation of the series of states of the code to identify transformations that each represent general state changes from a prior state to a subsequent state of the series of states. Based on these identified transformations, the computing system identifies transformation sequences that may each be performed in order to traverse the series of states from beginning to end. The computing system selects one of the transformation sequences that includes repeated transformations, potentially evaluates some of the remainder of the code to determine that there are other portion(s) of the code to which the repeated transformation may be applied, and offers to the developer to perform the repeated transformation. If that offer is accepted, then the repeated transformation is performed, alleviating the user from having to manually perform that transformation.

As the developer continues to modify the code, the computing system continues its observation, and offers up automation of repeated transformations to the user. Thus, the principles described herein allow for the automated identification of context-specific repeated transformations (e.g., repeated edits) that the developer is actually making in the code, and assists the user in automating the remainder of similar edits throughout the code. In some embodiments, the developer remains in the code drafting environment, and need make no special effort to help the computing system identify the repeated transformations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A through 1L illustrate several user interfaces in sequence that collectively show a user experience in which a developer makes a repeated edit of different lines of code, and then the computing system thereafter automatically makes the edits for the developer for other lines of the code;

FIG. 4 illustrate several transformation sequences, each being capable of, when executed, transforming the code from state S1 to S6 of FIGS. 3A and 3B;

DETAILED DESCRIPTION

Figure 2:
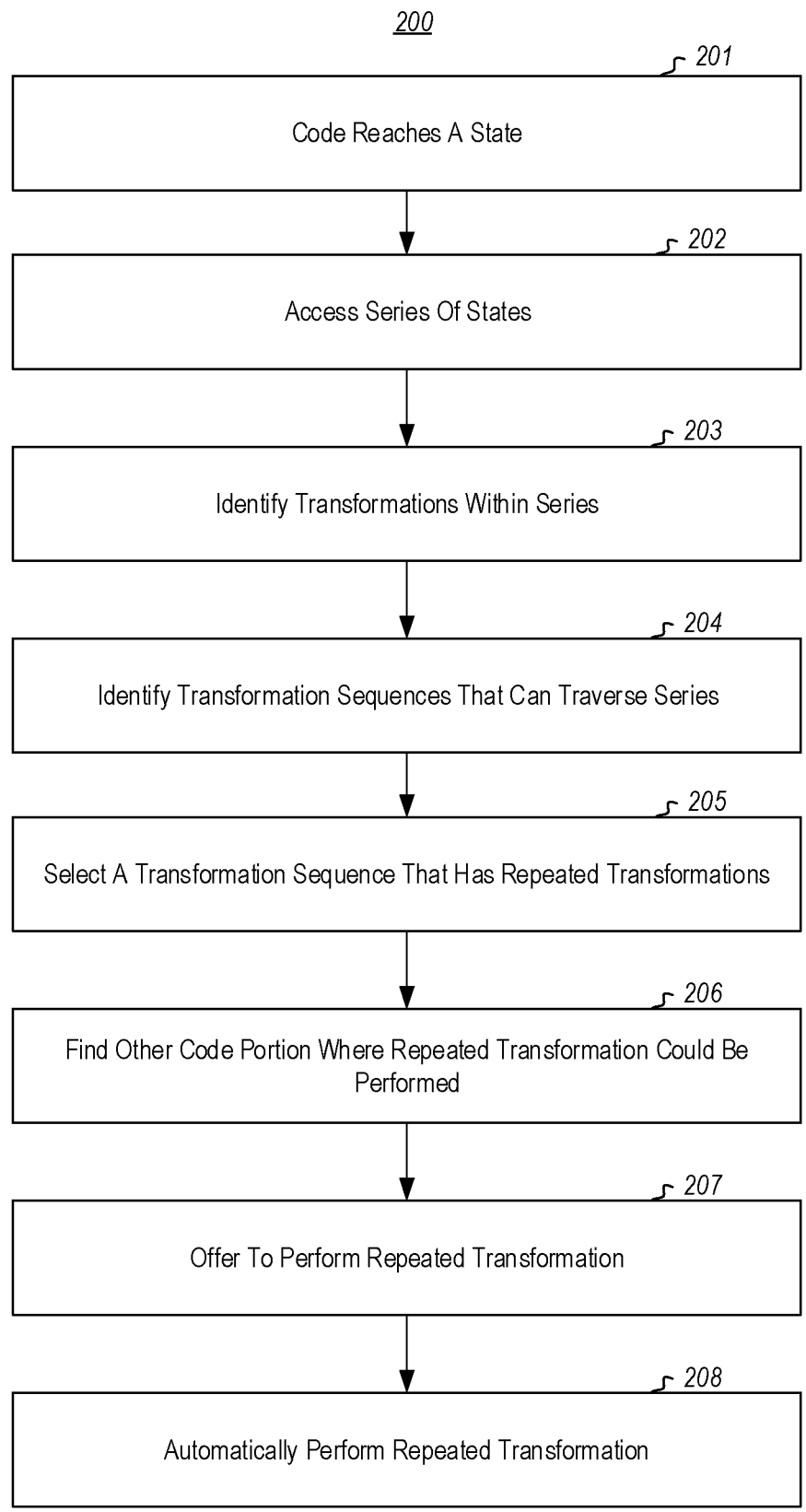
FIG. 2 illustrates a flowchart of a method for assisting automation of repeated edits for a developer that is modifying code, in accordance with the principles described herein.

At least some embodiments described herein relate to automatically identifying context-specific repeated transformations (i.e., code edit tasks) that are based on observation of the developer drafting or modifying the code. As the developer modifies the code, the code passes through a series of states, one after the other. The computing system observes the series of states of the code. It is based on this observation that the computing system identifies repeated transformations (e.g., repeated edits) of the code for potentially offering to continue performing the repeated transformations for the user. This alleviates the developer from having to manually perform the remainder of the repeated transformations.

The computing system uses the observation of the series of states of the code to identify transformations that each represent general state changes from a prior state to a subsequent state of the series of states. Based on these identified transformations, the computing system identifies transformation sequences that may each be performed in order to traverse the series of states from beginning to end. The computing system selects one of the transformation sequences that includes repeated transformations, potentially evaluates some of the remainder of the code to determine that there are other portion(s) of the code to which the repeated transformation may be applied, and offers to the developer to perform the repeated transformation. If that offer is accepted, then the repeated transformation is performed, alleviating the user from having to manually perform that transformation.

As the developer continues to modify the code, the computing system continues its observation, and offers up automation of repeated transformations to the user. Thus, the principles described herein allow for the automated identification of context-specific repeated transformations (e.g., repeated edits) that the developer is actually making in the code, and assists the user in automating the remainder of similar edits throughout the code. In some embodiments, the developer remains in the code drafting environment, and need make no special effort to help the computing system identify the repeated transformations.

Figures 1C, 1D:
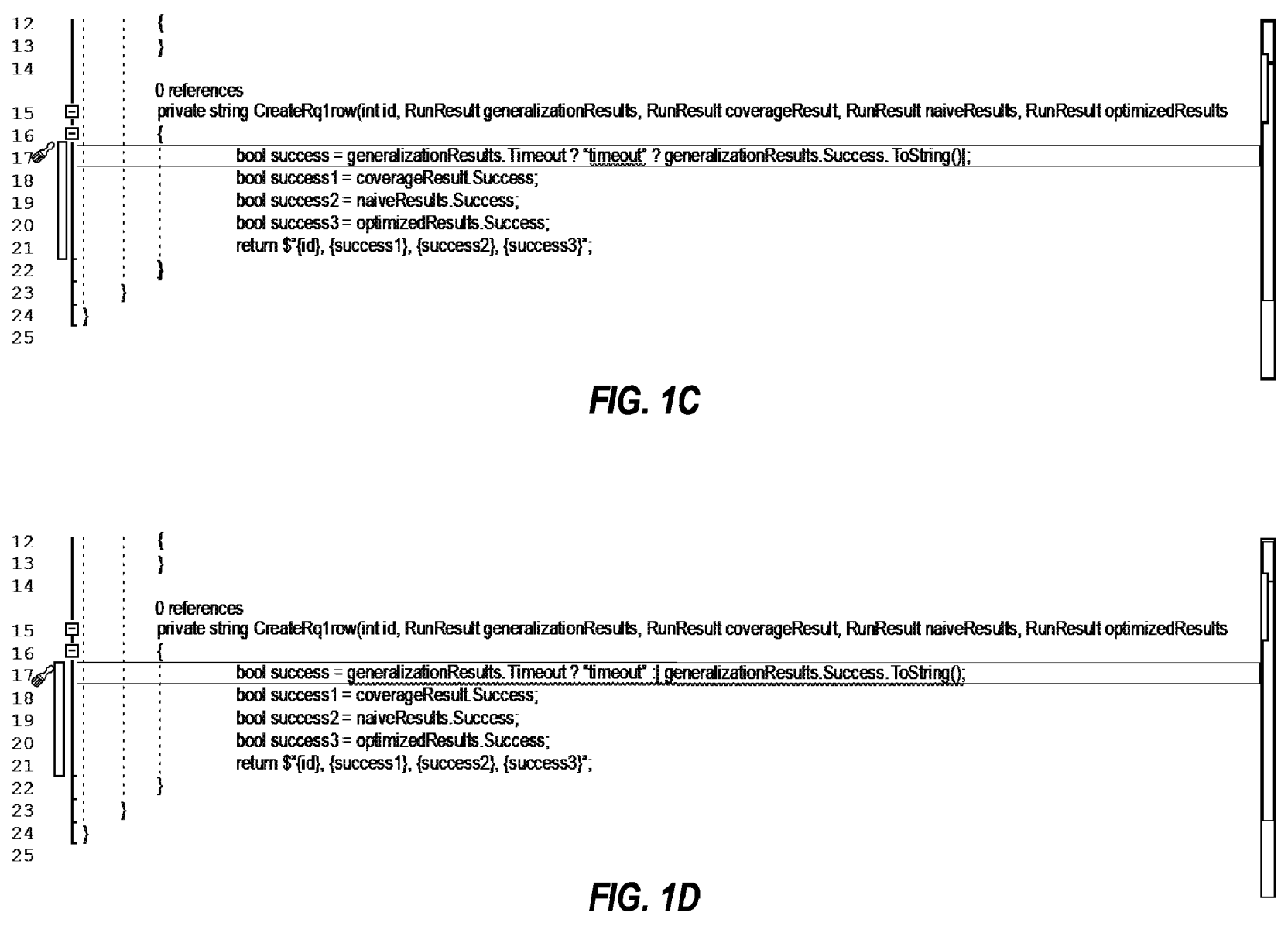

Prior to delving into the technical details, an example user experience enabled by the principles described herein will be described with respect to FIGS. 1A through 1L in sequence. In this user experience, a developer makes a repeated edit. Thereafter, in an additional two separate instances, the computing system offers to perform the repeated edit for the developer. An edit with respect to line 17 of example code is described with respect to FIGS. 1A through 1E. Another edit representing a repeated edit similar to that made to line 17 is then performed with respect to line 18 of the code, as described with respect to FIGS. 1F to 1H. When the user moves to line 19 of the code, where the repeated edit could again be performed, the computing system offers to the developer to automatically perform the edit, as described with respect to FIGS. 1I and 1J. When the user moves to line 20 of the code, where again the repeated edit could be performed, the computing system once again offers to the developer to automatically perform the edit, as described with respect to FIGS. 1K and 1L.

FIGS. 1A through 1E describe the user making several sub-edits in order to perform the initial edit. In general, the developer is attempting to cause the code to print a timeout should a run called "generalizationResults" take beyond a certain time to complete. FIG. 1A illustrates that the developer has navigated to line 17 of the code in order to perform the edit. In FIG. 1B, the developer has added the text "generalizationResults.Timeout? Timeout?" right before the text "generalizationResults.Success;". In FIG. 1C, the developer further adds the text ".ToString( )" right before the terminating semicolon. In FIG. 1D, the developer changes the second question mark to a colon. In FIG. 1E, the user replaces "bool" with "string". This represents a fairly comprehensive edit to line 17 of the code.

FIGS. 1F to 1H describe the user making several sub-edits in line 18 of the code, but now in a different order in order to perform the same (or a similar) larger edit as that described with respect to FIGS. 1A through 1E. This time, as shown in FIG. 1F, the user changes "bool" to "string" first. Then, as shown in FIG. 1G, the user adds "coverageResults.Timeout? "timeout":" after the equal symbol. In FIG. 1H, the user adds the text "ToString( )" prior to the terminating semicolon. Note that the variable name "coverageResults" in line 18 is different than the name of the variable "generalizationResults" in line 17. Furthermore, the constituent subedits are performed in a different order in the repeated edit of FIGS. 1F to 1H as compared to the initial edit in FIGS. 1A through 1E. Yet, the computing system recognizes that the developer has just performed a repeated edit in line 18 of the edit performed in line 17.

Figures 1I, 1J:
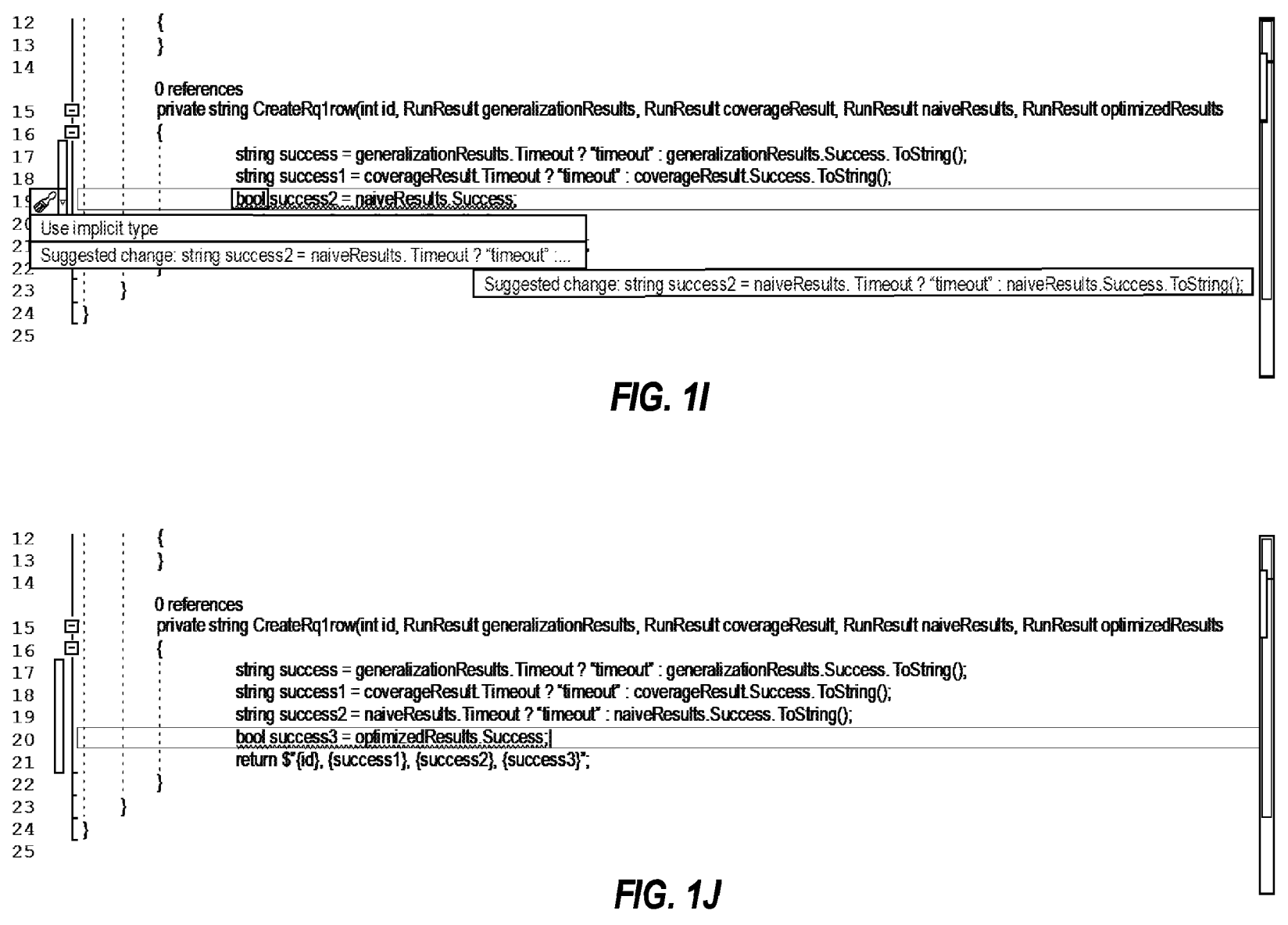

In FIG. 1I, the developer navigates to line 19 with the intent of repeating the edit again. However, the computing system recognizes that the same repeated edit may be applied to line 19 as well. Accordingly, as shown in FIG. 1I, the computing system offers to perform the repeated edit for the developer, showing the developer what the edit would look like. This offer takes two forms. First, visual emphasis (e.g., adding a squiggly underline) of line 19 is made to represent to the developer that a context-specific repeated edit may be made to that line. Also, the offer takes to form of a window that shows the developer what the edit would look like. FIG. 1J illustrates the result of the developer accepting that offer, with the edit automatically made to line 19. Note that the developer might have accepted that offer while the user is developing the code. On the other hand, the developer might accept the offer later as the line 19 may remain visually emphasized to keep the offer open.

Finally, in FIG. 1K, the developer navigates to line 20 with again the intent of repeating the edit again. The computing system again recognizes that the same repeated edit may be applied to line 20 as well. Accordingly, as shown in FIG. 1K, the computing system offers to perform the repeated edit for the developer. For instance, line 20 is also visually emphasized (e.g., underlined with squiggly underlining) to represent to the developer that the context-specific edit may be performed there. Furthermore, a window may open showing the developer what the edit would look like. FIG. 1L illustrates the result of the developer accepting that offer, with the edit automatically made to line 20.

The user experience is quite seamless, as the computing system simply offers to complete repeated transformations (i.e., repeated edits). This may even occur while the developer is editing the code, although the offer to perform the context-specific repeated edit may be accepted at any time. While the user experience is seamless, the technology that facilitates that experience is significant as will now be described.

FIG. 2 illustrates a flowchart of a method 200 for assisting automation of repeated edits for a developer that is modifying code. The repeated performance of the method 200 allows for user experiences such as the user experience described above with respect to FIGS. 1A through 1L. Accordingly, the method 200 will now be described with frequent reference to the user experience of FIGS. 1A through 1L as an example user experience only.

The method 200 may be performed by a computing system, such as the computing system 600 described below with respect to FIG. 6. For instance, the method 200 may be performed by one or more processors (e.g., the hardware processing unit 602) of the computing system 600 executing computer-executable instructions that are on one or more computer-readable media (e.g., memory 604). This computing system may be the same computing system that the developer is using to author code. Alternatively, the developer may edit the code on a client computing system, while the method 200 is performed on another computing system, such as in a cloud computing environment that has access to the code that the developer is editing.

Figure 3A:
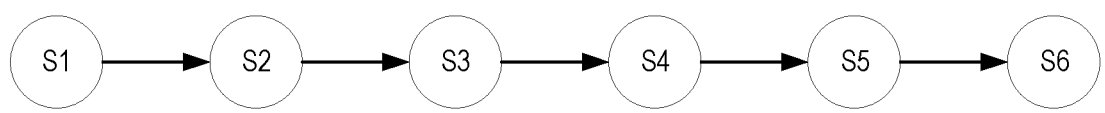
FIG. 3A illustrates an example representation of a series of states S1 to S6 in sequence, and is used as an example herein to explain the operation of the method of FIG. 2.

The method 200 is performed when the computing system observes that the code has passed into a state (act 201). The method 200 need not be performed every time that the code passes into a state though that certainly may be the case. FIG. 3A illustrates an example representation of a series 300A of states S1 to S6 in sequence. In one embodiment, these states are parsable states on the assumption that parsable states can be ignored. However, the broader principles described herein are not restricted to whether the states in the series 300A are parsable or unparsable, or a mix.

In the example of FIG. 3A, suppose that the code has only just now entered state S6, thus triggering the performance of method 200. Referring to FIGS. 1A through 1L, the developer might just have completed the repeated edit (completing FIGS. 1A through 1H). The method 200 might have previously been performed once for each of states S1 to S5 in sequence. There may be results of these previous performances of the method 200 that may be reused for the performance of the method 200 upon the code reaching state S6. More generally stated, upon reaching any subsequent state, the method 200 may leverage upon the previous performances of the method 200. This significantly reduces the computation performed in completing the method 200 upon reaching a state, and thus reduces latency in presenting a suggestion after reaching that state. This makes it more likely that suggestions for repeated edits will be of higher quality and timely provided to a developer that is editing that code.

The method 200 includes accessing a series of states of code that a developer is modifying (act 202). For instance, referring to FIG. 3A, the series 300A of states might be states S1 to S6. In one embodiment, it is not the code that the computing system uses to evaluate the code state, but rather an abstract syntax tree (or "AST") of that code at that state.

Figure 3B:
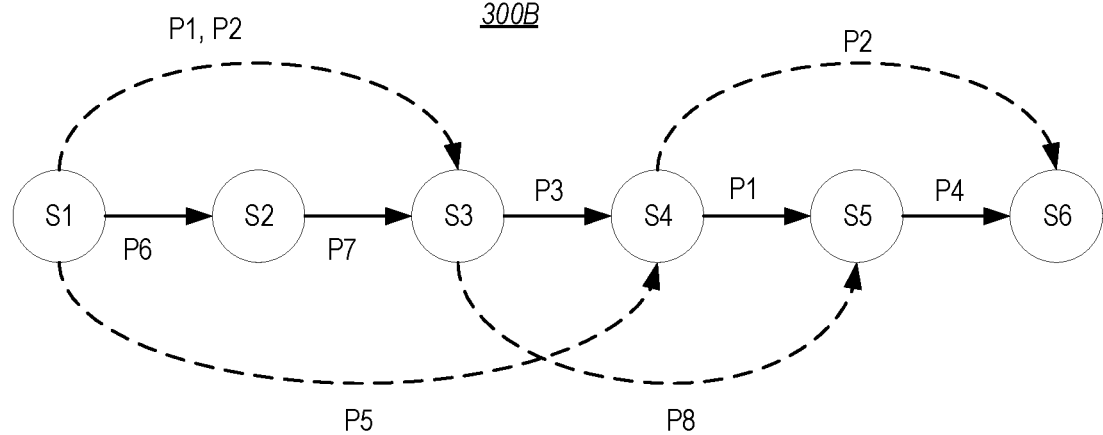
FIG. 3B illustrates an example representation of a directed acyclic graph of transformations that is built upon the example series of FIG. 3A.

The method 200 also includes identifying multiple transformations that each represent state changes from a prior state of the series of states to a subsequent state in the series (act 203). Referring to FIG. 3B, the series 300A of states of FIG. 3A is again shown (as graph 300B), but this time with several transformations shown. The graph 300B is now represented as a directed acyclic graph, where transformations are represented by edges, and states are represented as nodes. The transformations may be broadly represented, and programmatically synthesized based on the input code state and the output code state. As an example, the transformations may be defined by a domain-specific program description language.

In the example of FIG. 3B, there are several instances of repeated transformations within the graph 300B. For instance, repeated transformation P1 may be used to change the code from state S1 to S3, as well as from state S4 to S5. Transformation P2 is also a repeated transformation, in that the transformation P2 may be used to change the code from state S1 to S3, as well as to change the code from state S4 to S6.

The example of FIG. 3B also shows instances of unrepeated transformations within the graph 300B. For instance, transformation P3 may be used to change from state S3 to S4, transformation P4 may be used to change from state S5 to S6, transformation P5 may be used to change from state S1 to S4, transformation P6 may be used to change from state S1 to S2, transformation P7 may be used to change state S2 to S3, and transformation P8 may be used to change from state S3 to state S5.

As previously mentioned, the results from previous performances of the method 200 may be reused in the performance of the method 200 upon the code reaching state S6. For instance, the method 200 was previously performed upon the code reaching state S2, and at that time, would identify transformation P6 as being capable of transforming the code from state S1 to S2. Thereafter, the method 200 was performed upon the code reaching state S3, and would additionally identify transformation P7 as being capable of transforming the code from state S2 to S3, and transformations P1 and P2 as each being capable of transforming the code from state S1 to S3. Then, the method 200 was performed upon the code reaching state S4, and would additionally identify transformation P3 as being capable of transforming the code from state S3 to S4, and transformation P5 as being capable of transforming the code from state S1 to S4. Subsequently, the method 200 was performed upon the code reaching state S5, and would additionally identify transformation P1 as being capable of transforming the code from state S4 to S5, and transformation P8 as being capable of transforming the code from state S3 to S5.

The method 200 includes identifying transformation sequences that may each be performed in order to traverse the series of states (act 204). To "traverse" the series of states means to arrive at a last state of the series of states from a first state of the series of states, though passage through every state is not required.

Figure 4:
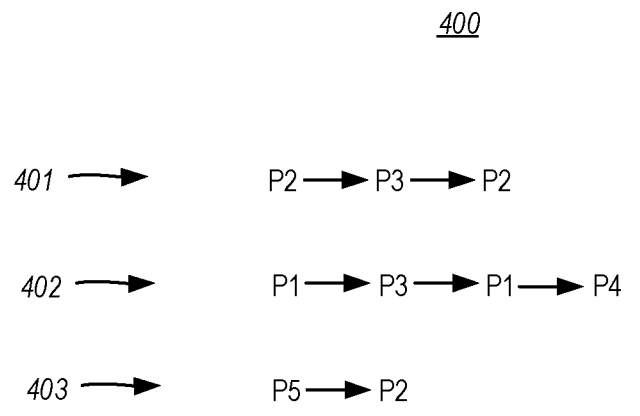

For instance, in FIG. 4, three transformation sequences 401, 402 and 403 are shown, each being capable of, when executed, transforming the code from state S1 to S6. As an example, sequence 401 involves first performing transformation P2 on state S1 which would result in state S3, then performing transformation P3 on state S3 which would result in state S4, and finally for a second time performing transformation P2 but on state S4 which would result in state S6. Also, in this example, sequence 402 involves first performing transformation P1 on state S1 which would result in state S3, then performing transformation P3 on state S3 which would result in state S4, then for a second time performing transformation P1 but on state S4 which would result in state S5, and finally performing transformation P4 on state S5 which would result in state S6. As a final sequence in this example, sequence 403 involves first performing transformation P5 on state S1 which would result in state S4, and then performing transformation P2 on state S4 which would result in state S6.

Note that the sequences 401, 402 and 403 are not the only possible transformation sequences that may be performed in order to go from state S1 to state S6. In fact, there are eleven possible transformation sequences. The possible transformation sequences include at least 1) P6 to P7 to P3 to P1 to P4, 2) P1 to P3 to P1 to P4, 3) P2 to P3 to P1 to P4, 4) P6 to P7 to P8 to P4, 5) P6 to P7 to P3 to P2, 6) P1 to P8 to P4, 7) P2 to P8 to P4, 8) P1 to P3 to P2, 9) P2 to P3 to P2, 10) P5 to P1 to P4, and 11) P5 to P2. Accordingly, the method 200 does not require than all possible transformation sequences be identified. Furthermore, the beginning parts of all of these possible transformation sequences may be obtained from prior performances of the method 200, thereby leveraging the prior performances of the method 200 in order to perform act 204 for state S6.

One or more of these identified transformation sequences will have repeated transformations. Accordingly, the method 200 includes identifying a particular transformation sequence in the identified transformation sequences as having a repeated transformation (act 205). Referring to FIG. 4, there are two possible transformation sequences 401 and 402 that have repeated transformations. In transformation sequence 401, transformation P2 is repeated. In transformation sequence 402, transformation P1 is repeated.

Accordingly, in this case, multiple transformation sequences are identified as having at least one repeated transformation. Accordingly, the principles described herein allow for the selection of a single transformation sequence that has a repeated transformation. In one embodiment, this selection is based on at least one of 1) which of the transformation sequences has most coverage of constituent repeated transformations, and 2) which of the transformation sequences has the most general repeated transformations.

For instance, the repeated transformation P2 is two-thirds of the entire transformation sequence 401, and the repeated transformation P1 is only one half of the entire transformation sequence 402. Thus, if the transformation sequence is selected based on coverage of constituent repeated transformations, the transformation sequence 401 would be selected. Furthermore, transformation P2 is a more general transformation than transformation P1. For instance, in at least some cases, transformation P2 is more general than transformation T1. Thus, if the transformation sequence is selected based on generality of constituent repeated transformations, the transformation sequence 401 would still be selected. In one embodiment, the selection is based on coverage, with a tie broken by generality.

Alternatively, or in addition, the selection of the transformation sequence is based on scores of the constituent repeated transformation. That score might be based on a history of acceptance or rejection of suggested automation of this or similar repeated transformations amongst this or a collection of developers, a degree or balance of generality versus specificity with an ideal degree or balance of the same, the nature of the output of the transformation, and/or other attributes of the transformation.

In the example of FIGS. 1A through 1L, the repeated transformation P2 may represent the repeated edit that is made to both line 17 (as shown in FIGS. 1A through 1E) as well as line 18 (as shown in FIGS. 1F through 1H). There were other repeated edits—such as the changing of the string "bool" to "string", which were rejected in favor of the more general edit made throughout each respective line of code.

Optionally, the method 200 then evaluates the code to determine that the repeated transformation may be performed in at least one other location in the code (act 206). The method 200 also includes offering to the developer to perform the repeated transformation in the selected transformation sequence (act 207). This offer occurs while the developer is still working on modifying the code. For instance, if the transformation sequence 401 in FIG. 4 was selected (in act 205), then the computing system would offer to the developer to automatically perform the repeated transformation P2, potentially conditioned upon the computing system confirming there is at least one other location in the code where the transformation P2 could be performed (act 206). In the example of FIGS. 1A through 1L, the computing system makes a first offer for line 19 in FIG. 1I, and a second offer for line 20 in FIG. 1K.

Finally, in response to receiving an indication from the developer that the repeated transformation is to be applied, the computing system automatically performs the repeated transformation for at least one other portion (and perhaps multiple other portions) of the code (act 208). As an example, the developer may be presented with the offer via the user interface that the developer is actually using to modify the code, and may accept that offer via the same user interface. In the example of FIGS. 1A through 1L, the computing system automatically performs the edit to line 19 as shown in FIG. 1J, and automatically performs the edit to line 20 as shown in FIG. 1L.

Figure 5:
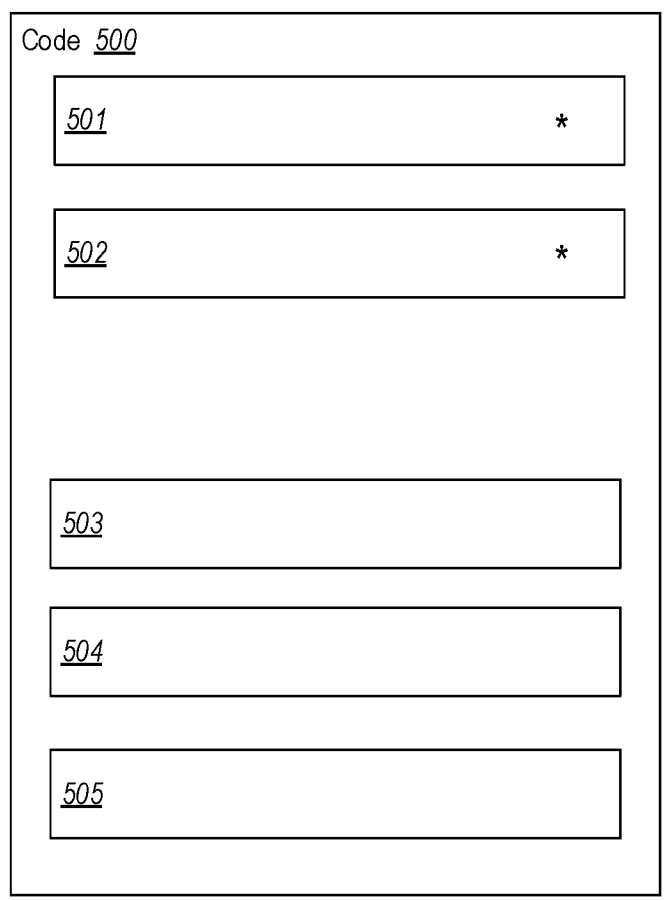
FIG. 5 illustrates code that includes five portions where the repeated transformation could be applied, including two portions where the developer manually performed a repeated edit, and three other portions where the computing system may automatically perform the repeated edit for the user.

More generally speaking, FIG. 5 illustrates code 500 that includes five portions 501 through 505 where the repeated transformation could be applied. Portions 501 and 502 are marked with an asterisk to represent that these are portions that the developer manually edited to allow the computing system to recognize that a repeated edit is being performed. Then, the computing system may offer to the user to perform the repeated transformation throughout the remainder of the code (e.g., at portions 503, 504 and 505). In one case, at each location 503, 504, and 505, prior to automatically making the edit, the computing system may show how the repeated transformation may be applied to that portion—perhaps showing the input to, and the output from, that repeated transformation. If the user likes how the transformation would be applied, the developer may select a control to accept that transformation so that it is automatically applied to the corresponding portion of the code.

As explained previously, the method 200 may be performed perhaps as often as each time the code enters a state. Thus, although the number of states S1 through S6 in the example series 300A of FIG. 3A is six, that number may increase as further edits are made to the code. In order to keep the calculation of suggested repeated edits less complex, and thus more quickly performed, and thus more relevant to what the developer is doing, the number of states evaluated may be kept within a certain predetermined limit.

For instance, the number of states might be limited to 20 states. Thus, at some future time, the computing system may evaluate the series of states from S1 to S20. If a new state S21 is then added to the series (due to further modification of the code by the developer), the oldest state S1 may then be removed. Thus, in the next iteration of the method 200, perhaps the series from S2 to S21 is evaluated. In this manner, the series being evaluated may be a rolling series of states with new states being added to the series, and older states being removed from the series, as the developer continues to modify the code. As an older state is removed, transformations that originated at that older state may be forgotten or removed from consideration.

There are other ways to make the computation of the suggested edit less cumbersome. Another way is to limit the number of transformations being analyzed for potential building of transformation sequences. Yet another way is to limit the number of transformation sequences being built from transformations. As a simple example, transformation sequences may be limited to transformations that do not overlap. Another way is to limit the total span of a transformation. For instance, perhaps a transformation is limited to skip over no more than a certain number of states. As an example, if the limit was four, a transformation spanning S7 to S11 would be permitted, but not a transformation spanning S7 to S12.

Accordingly, the principles described herein provide an effective mechanism to provide suggestions of repeated edits to the developer, and automate the repeated edits for the developer. This may even be done without the user having to leave the code editing environment, and preferably with the developer's full knowledge of how the repeated edits are applied, and with permission from the developer. Furthermore, the repeated edits are context-specific, in that they are identified based on active observation of what the developer is doing, or has done, to the code.

Note that the performance of the method 200, as well as the development environment, may be performed by a computing system. Accordingly, a computing system will now be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
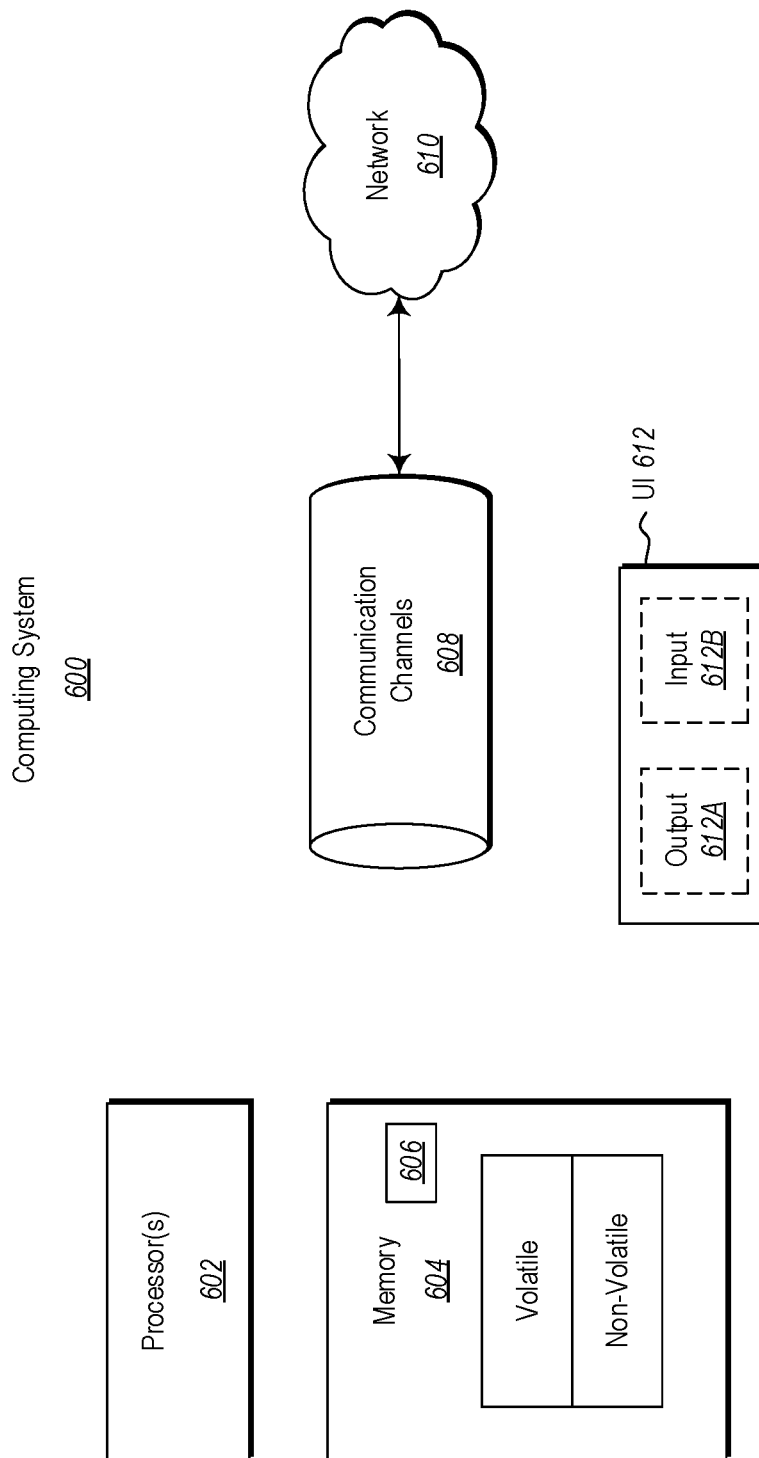
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to assist automation of repeated transformations executed against similar segments of code, said computing system comprising:
   one or more processors; and
   one or more computer-readable hardware storage devices that store instructions that are executable by the one or more processors to cause the computing system to at least:
   access a first segment of code, said first segment of code having an initial state;
   identify a plurality of transformations executed against the first segment of code, execution of the plurality of transformations resulting in the first segment of code being modified from having the initial state to having a final state;
   identify a second segment of code having an initial state that is similar to the initial state of the first segment of code;
   identify that the plurality of transformations are also being performed on the second segment of code such that the second segment of code is modified from having the initial state of the second segment of code to having a final state that is similar to the final state of the first segment of code;
   based on the plurality of transformations being applied to the first segment of code and to the second segment of code, automatically recognize that the plurality of transformations are also performable against other segments of code having initial states that are similar to the initial state of the first segment of code;

identify a third segment of code having an initial state that is similar to the initial state of the first segment of code;

within a user interface that is displaying the third segment of code, display a prompt at a location proximate to the third segment of code, said prompt indicating that the plurality of transformations are automatically executable against the third segment of code; and in response to receiving user input, automatically execute the plurality of transformations against the third segment of code such that the third segment of code is modified from having the initial state of the third segment of code to having a final state that is similar to the final state of the first segment of code.

2. The computing system in accordance with claim 1, wherein the prompt is displayed while a developer is working on modifying the code.

3. The computing system in accordance with claim 2, wherein an order by which the plurality of transformations is executed against the first segment of code is different than an order by which the plurality of transformations is executed against the second segment of code.

4. The computing system in accordance with claim 1, wherein the prompt includes a preview of the third segment of code in the final state.

5. The computing system in accordance with claim 1, wherein the prompt overlaps a different portion of code when the prompt is displayed at the location proximate to the third segment of code.

6. The computing system in accordance with claim 1, wherein the prompt includes visually emphasizing the third segment of code to indicate that the plurality of transformations are available for execution against the third segment of code.

7. The computing system in accordance with claim 6, wherein the prompt further includes displaying a window that includes a preview of the third segment of code in the final state.

8. The computing system in accordance with claim 7, wherein the window overlaps one or more other segments of the code.

9. The computing system in accordance with claim 1, wherein displaying the prompt is performed after a developer navigates to the third segment of code.

10. The computing system in accordance with claim 1, wherein the prompt includes a preview of the third segment of code in the final state, and wherein the prompt overlaps a different segment of the code.

11. The computing system of claim 1, wherein:
the first segment of code includes a first variable definition statement defining attributes for a first variable of a particular type,
the second segment of code includes a second variable definition statement defining attributes for a second variable of the same particular type, and
the initial state of the second segment of code is similar to the initial state of the first segment of code at least as a result of the second variable being of the same particular type as the first variable.

12. A method performed by a computing system of assisting automation of repeated transformations executed against similar segments of code, the method comprising:

accessing a first segment of code, said first segment of code having an initial state;

identifying a plurality of transformations executed against the first segment of code, execution of the plurality of transformations resulting in the first segment of code being modified from having the initial state to having a final state;

identifying a second segment of code having an initial state that is similar to the initial state of the first segment of code;

identifying that the plurality of transformations are also being performed on the second segment of code such that the second segment of code is modified from having the initial state of the second segment of code to having a final state that is similar to the final state of the first segment of code;

based on the plurality of transformations being applied to the first segment of code and to the second segment of code, automatically recognizing that the plurality of transformations are also performable against other segments of code having initial states that are similar to the initial state of the first segment of code;

identifying a third segment of code having an initial state that is similar to the initial state of the first segment of code;

within a user interface that is displaying the third segment of code, displaying a prompt at a location proximate to the third segment of code, said prompt indicating that the plurality of transformations are automatically executable against the third segment of code; and in response to receiving user input, automatically executing the plurality of transformations against the third segment of code such that the third segment of code is modified from having the initial state of the third segment of code to having a final state that is similar to the final state of the first segment of code.

13. The method in accordance with claim 12, wherein the prompt is displayed while a developer is working on modifying the code.

14. The method in accordance with claim 13, wherein an order by which the plurality of transformations is executed against the first segment of code is different than an order by which the plurality of transformations is executed against the second segment of code.

15. The method in accordance with claim 12, wherein the prompt includes a preview of the third segment of code in the final state.

16. One or more hardware storage devices that store instructions that are executable by one or more processors of a computer system to cause the computer system to at least:

access a first segment of code, said first segment of code having an initial state;

identify a plurality of transformations executed against the first segment of code, execution of the plurality of transformations resulting in the first segment of code being modified from having the initial state to having a final state;

identify a second segment of code having an initial state that is similar to the initial state of the first segment of code;

identify that the plurality of transformations are also being performed on the second segment of code such that the second segment of code is modified from having the initial state of the second segment of code to having a final state that is similar to the final state of the first segment of code;

based on the plurality of transformations being applied to the first segment of code and to the second segment of code, automatically recognize that the plurality of transformations are also performable against other segments of code having initial states that are similar to the initial state of the first segment of code;

identify a third segment of code having an initial state that is similar to the initial state of the first segment of code;

within a user interface that is displaying the third segment of code, display a prompt at a location proximate to the third segment of code, said prompt indicating that the plurality of transformations are automatically executable against the third segment of code; and in response to receiving user input, automatically execute the plurality of transformations against the third segment of code such that the third segment of code is modified from having the initial state of the third segment of code to having a final state that is similar to the final state of the first segment of code.

17. The one or more hardware storage devices of claim 16, wherein the prompt is displayed while a developer is working on modifying the code.

18. The one or more hardware storage devices of claim 16, wherein an order by which the plurality of transformations is executed against the first segment of code is different than an order by which the plurality of transformations is executed against the second segment of code.

19. The one or more hardware storage devices of claim 16, wherein the prompt includes a preview of the third segment of code in the final state.

20. The one or more hardware storage devices of claim 16, wherein the prompt overlaps a different portion of code when the prompt is displayed at the location proximate to the third segment of code.

\* \* \* \* \*